(12) United States Patent
Ko et al.

(10) Patent No.: US 11,029,571 B2
(45) Date of Patent: Jun. 8, 2021

(54) DISPLAY PANEL

(71) Applicant: Au Optronics Corporation, Hsinchu (TW)

(72) Inventors: Cheng-Hung Ko, New Taipei (TW); Yi-Fu Chen, Kaohsiung (TW); Yu-Sen Chang, Hsinchu (TW); Chia-Heng Chen, Kaohsiung (TW); Hsiao-Chun Chen, Hsinchu (TW); You-Ying Lin, Changhua County (TW); Cheng-An Hsieh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 75 days.

(21) Appl. No.: 16/365,706

(22) Filed: Mar. 27, 2019

(65) Prior Publication Data

US 2019/0331975 A1    Oct. 31, 2019

(30) Foreign Application Priority Data

Apr. 25, 2018    (TW) .................................. 107114096

(51) Int. Cl.
| | | |
|---|---|---|
| *G02F 1/1362* | (2006.01) | |
| *G02F 1/1343* | (2006.01) | |
| *G02F 1/1345* | (2006.01) | |
| *G02F 1/1368* | (2006.01) | |

(52) U.S. Cl.
CPC ...... *G02F 1/136286* (2013.01); *G02F 1/1368* (2013.01); *G02F 1/13439* (2013.01); *G02F 1/13454* (2013.01); *G02F 1/136227* (2013.01); *G02F 1/13629* (2021.01); *G02F 1/136295* (2021.01); *G02F 2201/123* (2013.01)

(58) Field of Classification Search
CPC ................................................. G02F 1/13454
See application file for complete search history.

(56) References Cited

U.S. PATENT DOCUMENTS

| 5,757,450 A | 5/1998 | Fujii et al. | |
| 9,563,092 B2 | 2/2017 | Wang et al. | |
| 2005/0140642 A1* | 6/2005 | Chiu ........................ | G09G 3/20 |
| | | | 345/103 |

(Continued)

FOREIGN PATENT DOCUMENTS

| CN | 1811540 | 8/2006 |
| CN | 1892322 | 1/2007 |
| CN | 104166284 | 11/2014 |

*Primary Examiner* — Alexander P Gross
(74) *Attorney, Agent, or Firm* — JCIPRNET

(57) ABSTRACT

A display panel including a pixel array substrate, an opposite substrate, and a display media is provided. The pixel array substrate includes a substrate, a plurality of scan lines, a plurality of data lines, a plurality of pixel units, and a gate driving circuit. The gate driving circuit including a plurality of first signal lines, a plurality of second signal lines, a plurality of dummy signal lines, and a plurality of contact structures is disposed in a peripheral region of the substrate. Each of the second signal lines is electrically connected to one corresponding first signal line. Each of the dummy signal lines is electrically connected to one corresponding second signal line via one corresponding contact structure. Each of the first signal lines is electrically connected to the corresponding second signal line via one corresponding contact structure.

10 Claims, 8 Drawing Sheets

(56) References Cited

U.S. PATENT DOCUMENTS

| | | | |
|---|---|---|---|
| 2007/0002243 A1 | 1/2007 | Kim | |
| 2011/0019144 A1* | 1/2011 | Koh | G02F 1/13439 349/143 |
| 2012/0138938 A1* | 6/2012 | Bae | G02F 1/13439 257/59 |
| 2015/0029081 A1* | 1/2015 | Kawachi | G09G 3/3677 345/92 |
| 2016/0238868 A1 | 8/2016 | Wang et al. | |

* cited by examiner

DISPLAY PANEL

CROSS-REFERENCE TO RELATED APPLICATION

This application claims the priority benefit of Taiwan application serial no. 107114096, filed on Apr. 25, 2018. The entirety of the above-mentioned patent application is hereby incorporated by reference herein and made a part of this specification.

BACKGROUND OF THE INVENTION

Field of the Invention

The invention relates to a display panel, and more particularly, to a display panel having a gate driving circuit.

Description of Related Art

To achieve a display panel with narrow frame, a gate driver-on-array (GOA) technique has currently been developed. This technique includes forming a gate driving circuit structure driving a display panel in a peripheral region of the display panel to replace an external driver chip. As the demand for the resolution of the display panel continues to rise, the density of the signal lines of a display panel adopting a GOA technique and disposed in the peripheral region is inevitably increased, but under the limitation of a narrow frame, the signal lines readily generate the issue of impedance mismatch, thus causing the generation of bright/dark lines to the display screen.

SUMMARY OF THE INVENTION

Accordingly, the invention provides a display panel that may prevent the issue of impedance mismatch to signal lines in a peripheral region under the premise of high resolution and narrow frame.

A display panel of the invention includes a pixel array substrate, an opposite substrate disposed opposite to the pixel array substrate, and a display media disposed between the opposite substrate and the pixel array substrate. The pixel array substrate includes a substrate, a plurality of scan lines, a plurality of data lines, a plurality of pixel units, and a gate driving circuit. The substrate has a display region and a peripheral region located at a side of the display region. The plurality of scan lines and the plurality of data lines are disposed in the display region. The plurality of pixel units is arranged in the display region in array, and each of the pixel units is electrically connected to one of the plurality of scan lines and one of the plurality of data lines. The gate driving circuit is disposed in the peripheral region and includes a plurality of first signal lines, a plurality of second signal lines, a plurality of dummy signal lines, and a plurality of contact structures. The plurality of first signal lines is arranged in the peripheral region along a first direction and extended along a second direction. The plurality of second signal lines is extended along the first direction, wherein each of the second signal lines is respectively electrically connected to one corresponding first signal line. The plurality of dummy signal lines is extended along the first direction, and each of the dummy signal lines is respectively electrically connected to one corresponding second signal line. The plurality of contact structures is disposed corresponding to the plurality of first signal lines, the plurality of second signal lines, and the plurality of dummy signal lines, wherein each of the first signal lines is electrically connected to the corresponding second signal line via one corresponding contact structure, and each of the dummy signal lines is electrically connected to the corresponding second signal line via one corresponding contact structure.

Based on the above, in the display panel of the invention, the gate driving circuit disposed in the peripheral region in the pixel array substrate of the display panel includes the plurality of first signal lines arranged along the first direction and extended along the second direction, the plurality of second signal lines extended along the first direction, the plurality of dummy signal lines extended along the first direction, and the plurality of contact structures disposed corresponding to the plurality of first signal lines, the plurality of second signal lines and the plurality of dummy signal lines, wherein each of the plurality of first signal lines is electrically connected to one corresponding second signal line via one corresponding contact structure, each of the plurality of dummy signal lines is electrically connected to one corresponding second signal line via one corresponding contact structure, and each of the plurality of second signal lines is respectively electrically connected to one corresponding scan line, such that the distribution of the crossover capacitance value in the gate driving circuit is uniform. As a result, under the limitation of a narrow frame, the display panel may effectively prevent the issue of impedance mismatch between the plurality of first signal lines, between the plurality of second signal lines, and between the plurality of dummy signal lines in the gate driving circuit to increase the display quality of the display panel. Moreover, the configuration between the plurality of first signal lines, the plurality of second signal lines, the plurality of dummy signal lines, and the contact structures thereof is most space-saving.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
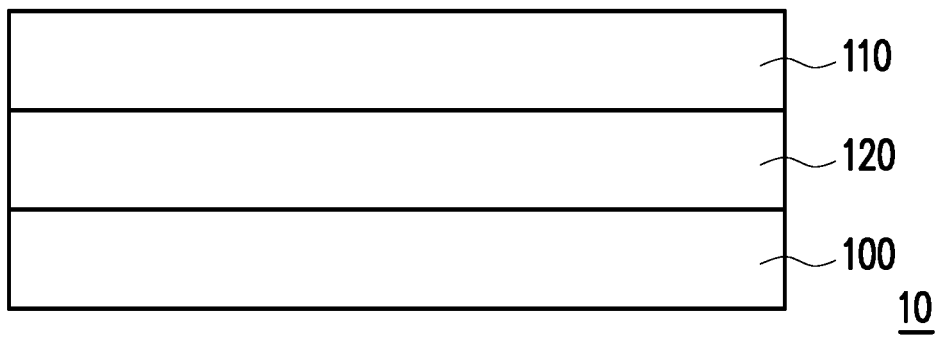
FIG. 1 is a cross section of a display panel according to an embodiment of the invention.

In the following, a plurality of embodiments of the invention is disclosed with reference to figures, and for clarity, many practical details are also provided herein. However, it should be understood that, these practical details should not be construed as limiting the invention. In other words, in some embodiments of the invention, these practical details are not necessary. Moreover, to simplify the figures, some known conventional structures and devices are shown as simple schematics in the figures.

"About", "approximate", "essentially", or "substantially" used in the present specification include a related value and an average within an acceptable deviation range of specific values determined by those with ordinary skills in the art with consideration of discussed measurement and a specific number of errors related to the measurement (i.e. a limitation of a measurement system). For instance, "about" may represent to be within one or a plurality of standard deviations of the related value, or, for instance, within ±30%, ±20%, ±15%, ±10%, or ±5%. Moreover, an acceptable range of deviation or standard deviation may be chosen for the terms "about", "approximate", "essentially", or "substantially" used in the present specification according to optical properties, etching properties, or other properties, instead of applying one standard deviation across all of the properties.

In the figures, for clarity, the thicknesses of, for instance, layers, films, panels, and regions are enlarged. Throughout the specification, the same reference numerals represent the same devices. It should be understood that, when a device such as a layer, film, region, or substrate is referred to as being "on" another device or "connected to" another device, the device may be directly on the other device or connected to the other device, or an intermediate device may be provided between the two. On the contrary, when a device is referred to as "directly on another device" or "directly connected to" another device, an intermediate device is omitted. As used in the present specification, "connected" may refer to being physically and/or electrically connected (coupled). Therefore, the electrical connection (or coupling) between two devices may include an intermediate device.

Unless otherwise defined, all of the terminology (including technical and scientific terms) used in the present specification have the same definitions generally known to those having ordinary skill in the art of the invention. It should be further understood that, the terminology defined in a common dictionary should be interpreted as having definitions consistent with the definitions in related art and the present specification of the invention, and do not adopt idealized or overly-formal definitions unless otherwise specified in the present specification.

Figure 2:
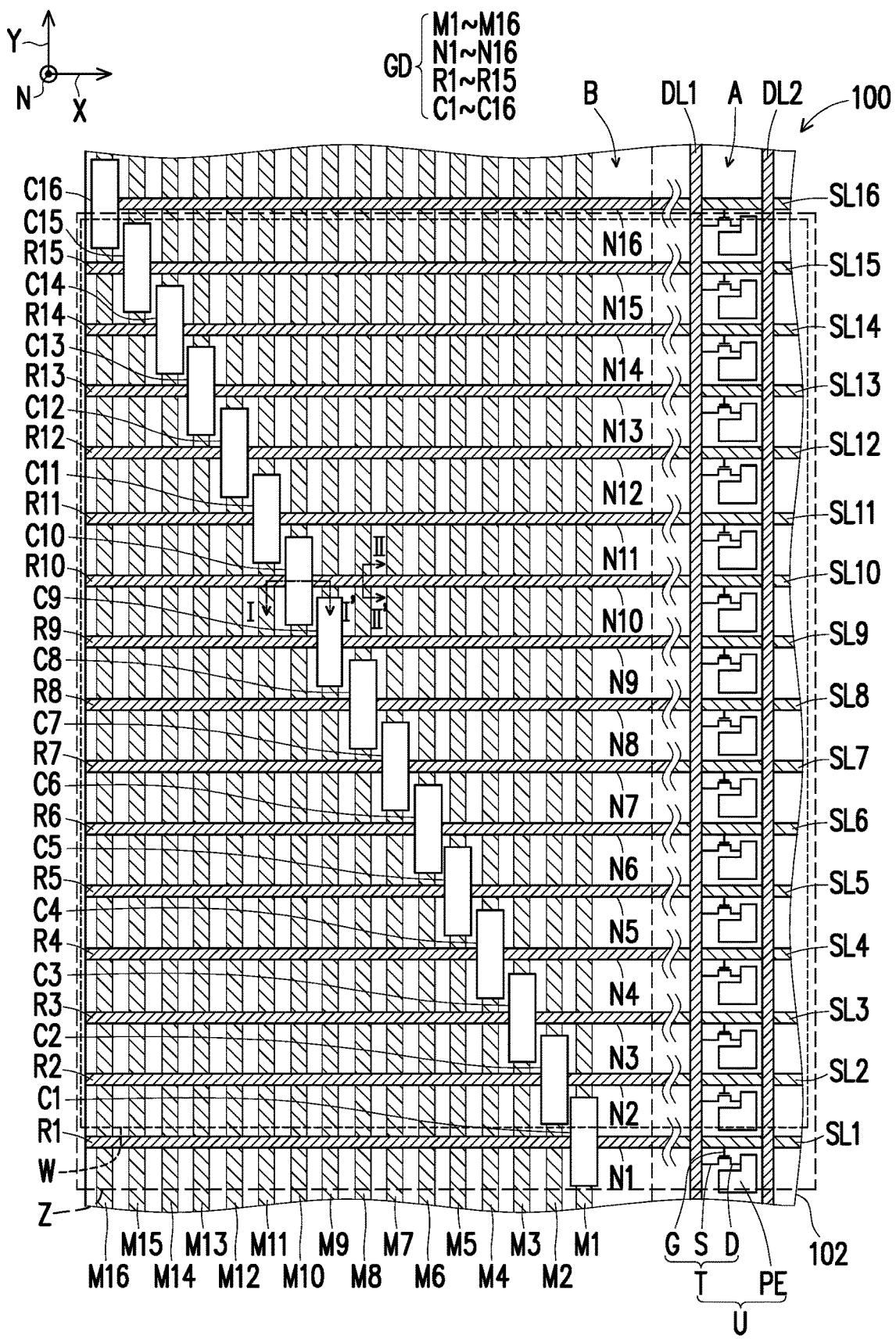
FIG. 2 is a top view of a pixel array substrate in the display panel of FIG. 1.
Figure 3:
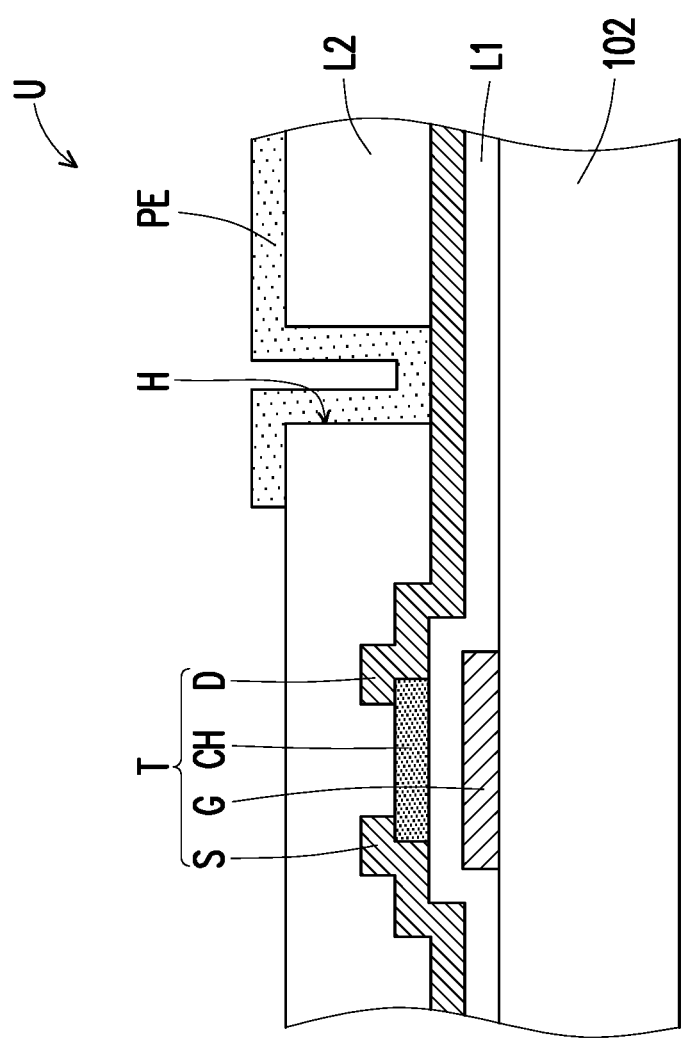
FIG. 3 is a cross section of a pixel unit in the pixel array substrate of FIG. 2.
Figure 4:
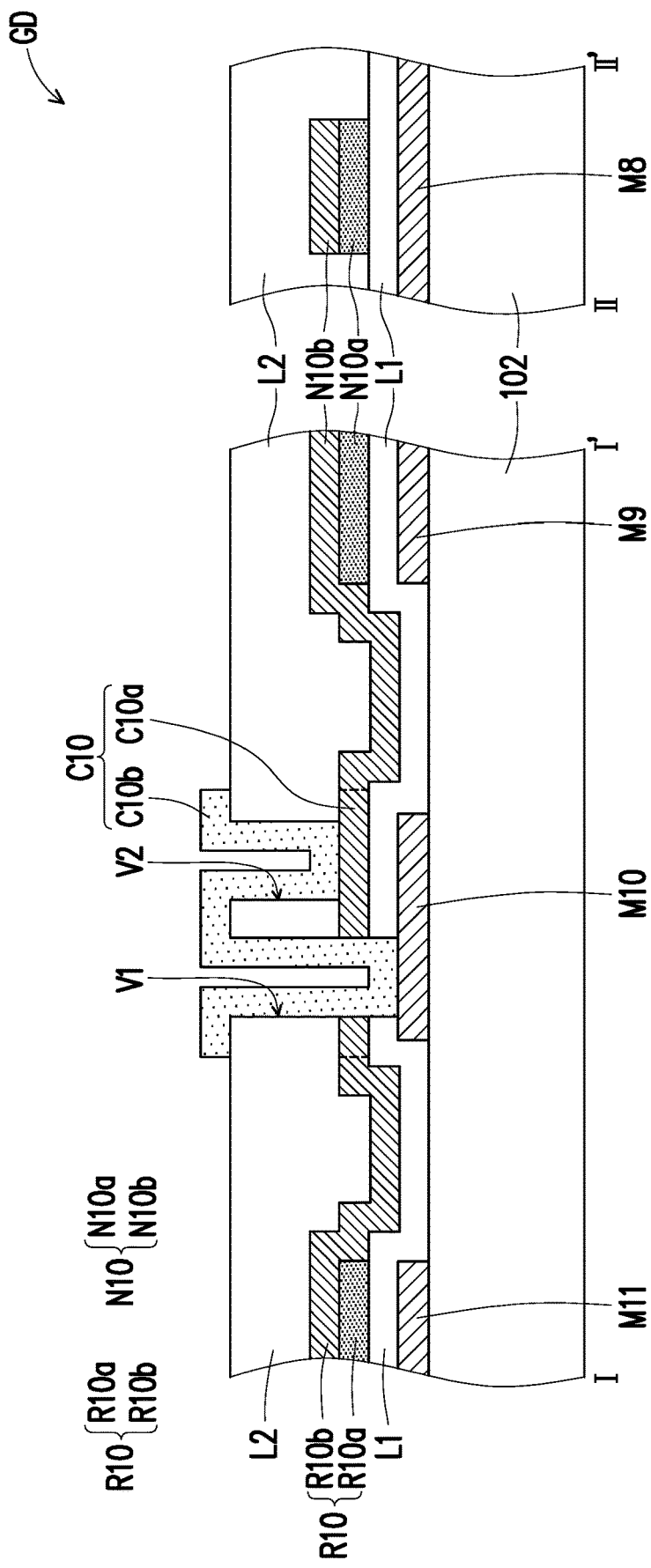
FIG. 4 is a partial cross section of a gate driving circuit in the pixel array substrate of FIG. 2.

FIG. 1 is a cross section of a display panel according to an embodiment of the invention. FIG. 2 is a top view of a pixel array substrate in the display panel of FIG. 1. FIG. 3 is a cross section of a pixel unit in the pixel array substrate of FIG. 2. FIG. 4 is a partial cross section of a gate driving circuit in the pixel array substrate of FIG. 2. It should be mentioned that, the cross-section locations of FIG. 4 correspond to the locations of section line I-I' and section line II-II' in FIG. 2.

Referring to all of FIG. 1 to FIG. 4, in the present embodiment, a display panel 10 includes a pixel array substrate 100, an opposite substrate 110, and a display media 120. Specifically, in the present embodiment, the pixel array substrate 100 may include a substrate 102, a plurality of scan lines SL1 to SL16, a plurality of data lines DL1 to DL2, a plurality of pixel units U, and a gate driving circuit GD. In the present embodiment, the pixel array substrate 100 may optionally further include an insulation layer L1 and an insulation layer L2. For the convenience of description, the insulation layer L1 and the insulation layer L2 are omitted in FIG. 2.

In the present embodiment, the display media 120 is disposed between the pixel array substrate 100 and the opposite substrate 110. In the present embodiment, the display media 120 may be a liquid crystal material. In other words, the display panel 10 may be a liquid crystal display panel. However, the invention is not limited thereto. In other embodiments, the display media 120 may also be other display materials such as an organic light-emitting material, inorganic light-emitting material, electrophoretic display material, or plasma display material. Therefore, the display panel 10 may also be a touch organic light-emitting display panel, touch inorganic light-emitting display panel, touch electrophoretic display panel, or touch plasma display panel.

In the present embodiment, the opposite substrate 110 and the pixel array substrate 100 are disposed opposite to each other. The opposite substrate 110 may be any opposite substrate for a touch display panel known to those having ordinary skill in the art. For instance, in an embodiment, the opposite substrate 110 may include, for instance, a blank substrate and a device layer located on the blank substrate. For instance, in an embodiment, the device layer of the opposite substrate 110 may include, for instance, a color filter layer, wavelength conversion layer, light-shielding pattern layer, opposite electrode layer, or a combination thereof, but is not limited thereto, and may be adjusted and modified as needed.

In the present embodiment, the substrate 102 has a display region A and a peripheral region B, wherein the peripheral region B is located at a side of the display region A. In the present embodiment, the material of the substrate 102 may be glass, quartz, plastic, or an organic polymer.

In the present embodiment, the plurality of scan lines SL1 to SL16 and the plurality of data lines DL1 to DL2 are disposed in the display region A. In the present embodiment, the data lines DL1 to DL2 are respectively disposed across the scan lines SL1 to SL16. In other words, in the present embodiment, the extending direction of the scan lines SL1 to SL16 is different from the extending direction of the data lines DL1 to DL2. As shown in FIG. 2, in the present embodiment, the extending direction of the scan lines SL1 to SL16 and the extending direction of the data lines DL1 to DL2 are preferably substantially perpendicular to each other. Moreover, the scan lines SL1 to SL16 and the data lines DL1 to DL2 may be located on different film layers, and the insulation layer L1 (described in detail later) is disposed between the scan lines SL1 to SL16 and the data lines DL1 to DL2. Considering electrical conductivity, the scan lines SL1 to SL16 and the data lines DL1 to DL2 are generally made using a metal material. However, the invention is not limited thereto, and according to other embodiments, the scan lines SL1 to SL16 and the data lines DL1 to DL2 may also be made using, for instance, an alloy, nitride of a metal material, oxide of a metal material, oxynitride of a metal material, a non-metallic material with electrical conductive properties, or other suitable materials.

In the present embodiment, the plurality of pixel units U is arranged in the display region A in array, and each of the pixel units U is electrically connected to one of the scan lines SL1 to SL16 and one of the data lines DL1 to DL2. In the present embodiment, each of the pixel units U includes an active device T and a pixel electrode PE.

Referring to both FIG. 2 and FIG. 3, in the present embodiment, each of the active devices T may include a gate G, an active layer CH disposed corresponding to the gate G, and a source S and a drain D electrically connected to the active layer CH. In the present embodiment, the active device T is exemplified as a bottom-gate thin-film transistor, but the invention is not limited thereto. In other embodiments, the active device T may also be a top-gate thin-film transistor, three-dimensional thin-film transistor, or other suitable types of thin-film transistors.

In the present embodiment, the gate G, the source S, and the drain D are generally made using a metal material. However, the invention is not limited thereto. According to other embodiments, the gate G, the source S, and the drain D may also be made using, for instance, an alloy, nitride of a metal material, oxide of a metal material, oxynitride of a metal material, a non-metallic material with electrical conductive properties, or other suitable materials.

In the present embodiment, the active layer CH may be a single layer or multilayer structure, and the material of the active layer CH contains amorphous silicon, polysilicon, microcrystalline silicon, monocrystalline silicon, organic semiconductor material, an oxide semiconductor material (such as indium zinc oxide, indium gallium zinc oxide, other suitable materials, or a combination thereof), a material containing a dopant in the above materials, other suitable materials, or a combination thereof. However, the invention is not limited thereto.

In the present embodiment, the insulation layer L1 is formed on the substrate 102 and located between the gates G and the active layers CH. In other words, in the present embodiment, the insulation layer L1 may be used as a gate insulation layer. In the present embodiment, the insulation layer L1 may be a single-layer or multilayer structure, and the material of the insulation layer L1 may include an inorganic material, organic material, or other suitable materials, wherein the inorganic material includes, for instance (but not limited to): silicon oxide, silicon nitride, or silicon oxynitride; and the organic material includes, for instance (but not limited to): a polyimide resin, epoxy resin, or acrylic resin.

Moreover, in the present embodiment, the insulation layer L2 may be formed on the substrate 102 and cover the sources S and the drains D to provide the function of insulation and protection. The insulation layer L2 may be a single-layer or multilayer structure, and the material of the insulation layer L2 may include an inorganic material, organic material, or other suitable materials, wherein the inorganic material includes, for instance (but not limited to): silicon oxide, silicon nitride, or silicon oxynitride; and the organic material includes, for instance (but not limited to): a polyimide resin, epoxy resin, or acrylic resin.

In the present embodiment, the pixel electrode PE is electrically connected to the drain D of the active device T via a contact H, wherein the contact H is disposed in the insulation layer L2. In the present embodiment, the material of the pixel electrode PE may include (but not limited to): a metal oxide conductive material such as indium tin oxide, indium zinc oxide, aluminum tin oxide, aluminum zinc oxide, indium gallium zinc oxide, other suitable oxides, or stacked layers of at least two of the above.

In the present embodiment, the gate driving circuit GD is disposed in the peripheral region B. Referring to FIG. 2, in the present embodiment, the gate driving circuit GD includes a plurality of first signal lines M1 to M16, a plurality of second signal lines N1 to N16, a plurality of dummy signal lines R1 to R15, and a plurality of contact structures C1 to C16. Moreover, as shown in FIG. 2, in the present embodiment, the pixel array substrate 100 includes one gate driving circuit GD, but the invention is not limited thereto. In other embodiments, the pixel array substrate 100 may include a plurality of gate driving circuits GD.

In the present embodiment, as shown in FIG. 2, the first signal lines M1 to M16 are arranged in the peripheral region B along a first direction X and extended along a second direction Y, the second signal lines N1 to N16 are extended along the first direction X, and the dummy signal lines R1 to R15 are extended along the first direction X. In the present embodiment, the first direction X and the second direction Y are different. As shown in FIG. 2, in the present embodiment, the first direction X and the second direction Y are preferably substantially perpendicular to each other.

In the present embodiment, the lengths of the second signal lines N1 to N16 are different from one another. As shown in FIG. 2, in the present embodiment, the lengths of the second signal lines N1 to N16 are gradually increased in order from the second signal line N1 to the second signal line N16, but the invention is not limited thereto. In the present embodiment, the lengths of the dummy signal lines R1 to R15 are different from one another. As shown in FIG. 2, in the present embodiment, the lengths of the dummy signal lines R1 to R15 are gradually decreased in order from the dummy signal line R1 to the dummy signal line R15, but the invention is not limited thereto.

In the present embodiment, the second signal line N2 and the first signal line M1 are overlapped in a vertical projection direction N, the second signal line N3 and the first signal lines M1 to M2 are overlapped in the vertical projection direction N, the second signal line N4 and the first signal lines M1 to M3 are overlapped in the vertical projection direction N, the second signal line N5 and the first signal lines M1 to M4 are overlapped in the vertical projection direction N, the second signal line N6 and the first signal lines M1 to M5 are overlapped in the vertical projection direction N, the second signal line N7 and the first signal lines M1 to M6 are overlapped in the vertical projection direction N, the second signal line N8 and the first signal lines M1 to M7 are overlapped in the vertical projection direction N, the second signal line N9 and the first signal lines M1 to M8 are overlapped in the vertical projection direction N, the second signal line N10 and the first signal lines M1 to M9 are overlapped in the vertical projection direction N, the second signal line N11 and the first signal lines M1 to M10 are overlapped in the vertical projection direction N, the second signal line N12 and the first signal lines M1 to M11 are overlapped in the vertical projection direction N, the second signal line N13 and the first signal lines M1 to M12 are overlapped in the vertical projection direction N, the second signal line N14 and the first signal lines M1 to M13 are overlapped in the vertical projection direction N, the second signal line N15 and the first signal lines M1 to M14 are overlapped in the vertical projection direction N, and the second signal line N16 and the first signal lines M1 to M15 are overlapped in the vertical projection direction N. In other words, in the present embodiment, in a region W of FIG. 2, each of the second signal lines N2 to N16 is respectively overlapped with at least one of the first signal lines M1 to M16 in the vertical projection direction N. From another perspective, the first signal lines M1 to M16 are extended along the second direction Y, and the second signal lines N1 to N16 are extended along the first direction X, and thus in the present embodiment, in the region W of FIG. 2, each of the second signal lines N2 to N16 is respectively disposed across at least one of the first signal lines M1 to M16.

In the present embodiment, the dummy signal line R1 and the first signal lines M2 to M16 are overlapped in the vertical projection direction N, the dummy signal line R2 and the first signal lines M3 to M16 are overlapped in the vertical projection direction N, the dummy signal line R3 and the first signal lines M4 to M16 are overlapped in the vertical projection direction N, the dummy signal line R4 and the first signal lines M5 to M16 are overlapped in the vertical projection direction N, the dummy signal line R5 and the first signal lines M6 to M16 are overlapped in the vertical projection direction N, the dummy signal line R6 and the first signal lines M7 to M16 are overlapped in the vertical projection direction N, the dummy signal line R7 and the first signal lines M8 to M16 are overlapped in the vertical projection direction N, the dummy signal line R8 and the first signal lines M9 to M16 are overlapped in the vertical projection direction N, the dummy signal line R9 and the first signal lines M10 to M16 are overlapped in the vertical projection direction N, the dummy signal line R10 and the first signal lines M11 to M16 are overlapped in the vertical projection direction N, the dummy signal line R11 and the first signal lines M12 to M16 are overlapped in the vertical projection direction N, the dummy signal line R12 and the first signal lines M13 to M16 are overlapped in the vertical projection direction N, the dummy signal line R13 and the first signal lines M14 to M16 are overlapped in the vertical projection direction N, the dummy signal line R14 and the first signal lines M15 to M16 are overlapped in the vertical projection direction N, and the dummy signal line R15 and the first signal line M16 are overlapped in the vertical projection direction N. In other words, in the present embodiment, in the region Z of FIG. 2, each of the dummy signal lines R1 to R15 is respectively overlapped with at least one of the first signal lines M1 to M16 in the vertical projection direction N. From another perspective, the first signal lines M1 to M16 are extended along the second direction Y, and the dummy signal lines R1 to R15 are extended along the first direction X, and thus in the present embodiment, in the region Z of FIG. 2, each of the dummy signal lines R1 to R15 is respectively disposed across at least one of the first signal lines M1 to M16.

In the present embodiment, the ends of the dummy signal lines R1 to R15 are aligned with an edge of the substrate 102. In other words, in the present embodiment, one end of the dummy signal lines R1 to R15 is not connected to any device.

In the present embodiment, the contact structure C1 is disposed corresponding to the first signal line M1, the second signal line N1, and the dummy signal line R1, the contact structure C2 is disposed corresponding to the first signal line M2, the second signal line N2, and the dummy signal line R2, the contact structure C3 is disposed corresponding to the first signal line M3, the second signal line N3, and the dummy signal line R3, the contact structure C4 is disposed corresponding to the first signal line M4, the second signal line N4, and the dummy signal line R4, the contact structure C5 is disposed corresponding to the first signal line M5, the second signal line N5, and the dummy signal line R5, the contact structure C6 is disposed corresponding to the first signal line M6, the second signal line N6, and the dummy signal line R6, the contact structure C7 is disposed corresponding to the first signal line M7, the second signal line N7, and the dummy signal line R7, the contact structure C8 is disposed corresponding to the first signal line M8, the second signal line N8, and the dummy signal line R8, the contact structure C9 is disposed corresponding to the first signal line M9, the second signal line N9, and the dummy signal line R9, the contact structure C10 is disposed corresponding to the first signal line M10, the second signal line N10, and the dummy signal line R10, the contact structure C11 is disposed corresponding to the first signal line M11, the second signal line N11, and the dummy signal line R11, the contact structure C12 is disposed corresponding to the first signal line M12, the second signal line N12, and the dummy signal line R12, the contact structure C13 is disposed corresponding to the first signal line M13, the second signal line N13, and the dummy signal line R13, the contact structure C14 is disposed corresponding to the first signal line M14, the second signal line N14, and the dummy signal line R14, the contact structure C15 is disposed corresponding to the first signal line M15, the second signal line N15, and the dummy signal line R15, and the contact structure C16 is disposed corresponding to the first signal line M16 and the second signal line N16. In other words, in the present embodiment, in the region Z of FIG. 2, the contact structures C1 to C15 are disposed corresponding to the first signal lines M1 to M15, the second signal lines N1 to N15, and the dummy signal lines R1 to R15. From another perspective, in the present embodiment, the contact structures C1 to C16 are respectively disposed corresponding to the second signal lines N1 to N16, and therefore the contact structures C1 to C16 are not located on the same horizontal axis. This design may be more space-saving in configuration so as to achieve the effect of a narrow frame.

In the present embodiment, the sum of the length of the second signal line N1 and the length of the dummy signal line R1 corresponding to the contact structure C1, the sum of the length of the second signal line N2 and the length of the dummy signal line R2 corresponding to the contact structure C2, the sum of the length of the second signal line N3 and the length of the dummy signal line R3 corresponding to the contact structure C3, the sum of the length of the second signal line N4 and the length of the dummy signal line R4 corresponding to the contact structure C4, the sum of the length of the second signal line N5 and the length of the dummy signal line R5 corresponding to the contact structure C5, the sum of the length of the second signal line N6 and the length of the dummy signal line R6 corresponding to the contact structure C6, the sum of the length of the second signal line N7 and the length of the dummy signal line R7 corresponding to the contact structure C7, the sum of the length of the second signal line N8 and the length of the dummy signal line R8 corresponding to the contact structure C8, the sum of the length of the second signal line N9 and the length of the dummy signal line R9 corresponding to the contact structure C9, the sum of the length of the second signal line N10 and the length of the dummy signal line R10 corresponding to the contact structure C10, the sum of the length of the second signal line N11 and the length of the dummy signal line R11 corresponding to the contact structure C11, the sum of the length of the second signal line N12 and the length of the dummy signal line R12 corresponding to the contact structure C12, the sum of the length of the second signal line N13 and the length of the dummy signal line R13 corresponding to the contact structure C13, the sum of the length of the second signal line N14 and the length of the dummy signal line R14 corresponding to the contact structure C14, and the sum of the length of the second signal line N15 and the length of the dummy signal line R15 corresponding to the contact structure C15 are the same, and the sums above are the same as the length of the second signal line N16 corresponding to the contact structure C16. In other words, in the present embodiment, in the region Z of FIG. 2, the sum of the length of the second signal line (i.e., one of the second signal lines N1 to N15) and the length of the dummy signal line (i.e., one of the dummy signal lines R1 to R15) corresponding to one of the contact structures C1 to C15 is the same as the sum of the length of the second signal line (i.e., another one of the second signal lines N1 to N15) and the length of the dummy signal line (i.e., another one of the dummy signal lines R1 to R15) corresponding to another one of the contact structures C1 to C15.

In the following, the structures of and the configuration relationships and connection relationships among the first signals lines M1 to M16, the second signal lines N1 to N16, the dummy signal lines R1 to R15, and the contact structures C1 to C16 are described with reference to all of FIG. 2, FIG. 3, and FIG. 4. It should be mentioned that, although in FIG. 4, the structures of and configuration relationships and connection relationships among the second signal line N10, the first signal line M10, the dummy signal line R10, and the contact structure C10 are mainly described with the second signal line N10 and the first signal line M10, the dummy signal line R10, and the contact structure C10 corresponding to the second signal line N10 as an example, any person having ordinary skill in the art should be able to understand the overall architecture of the gate driving circuit GD according to descriptions relating to the second signal line N10, the first signal line M10, the dummy signal line R10, and the contact structure C10 below.

Referring to both FIG. 2 and FIG. 4, in the present embodiment, the second signal line N10 and the first signal line M10 are electrically connected to each other via the contact structure C10. Accordingly, any person having ordinary skill in the art should be able to understand that, in the present embodiment, the second signal lines N1 to N9 and N11 to N16 are respectively electrically connected to the corresponding first signal lines M1 to M9 and M11 to M16 via the corresponding contact structures C1 to C9 and C11 to C16. In other words, in the present embodiment, the second signal lines N1 to N16 and the first signal lines M1 to M16 may have a one-to-one connection relationship, such that a signal received by the first signal lines M1 to M16 from an external circuit may be respectively sent via the corresponding second signal lines N1 to N16.

In the present embodiment, the second signal line N10 and the dummy signal line R10 are electrically connected to each other via the contact structure C10. Accordingly, any person having ordinary skill in the art should be able to understand that, in the present embodiment, the second signal lines N1 to N9 and N11 to N15 are respectively electrically connected to the corresponding dummy signal lines R1 to R9 and R11 to R15 via the corresponding contact structures C1 to C9 and C11 to C15. In other words, in the present embodiment, in the region Z of FIG. 2, the second signal lines N1 to N15 and the dummy signal lines R1 to R15 may have a one-to-one connection relationship, such that the dummy signal lines R1 to R15 may receive signals respectively the same as the corresponding second signal lines N1 to N15.

Referring to all of FIG. 2, FIG. 3, and FIG. 4, in the present embodiment, the material of the first signal lines M8 to M11 is the same as the material of the gate G. In other words, any person having ordinary skill in the art should be able to understand that, in the present embodiment, the material of the first signal lines M1 to M16 is, for instance (but not limited to): a metal material, alloy, nitride of a metal material, oxide of a metal material, oxynitride of a metal material, a non-metallic material with electrical conductive properties, or other suitable materials. From another perspective, any person having ordinary skill in the art should be able to understand that, in the present embodiment, the first signal lines M1 to M16 and the gates G may be formed in the same photomask process.

Referring to FIG. 2 and FIG. 4, in the present embodiment, the second signal line N10 includes a sublayer N10$a$ and a sublayer N10$b$, wherein the sublayer N10$b$ is located on the sublayer N10$a$. Moreover, in the present embodiment, the sublayer N10$b$ is directly located on the sublayer N10$a$. Accordingly, any person having ordinary skill in the art should be able to understand that, in the present embodiment, the second signal lines N1 to N16 all may include a bilayer structure.

Moreover, referring to all of FIG. 2, FIG. 3, and FIG. 4, in the present embodiment, the material of the sublayer N10$a$ and the material of the active layer CH are the same, and the material of the sublayer N10$b$ and the material of the source S and the drain D are the same. In other words, any person having ordinary skill in the art should be able to understand that, in the present embodiment, the material of a sublayer (such as the sublayer N10$a$) of any of the second signal lines N1 to N16 includes, for instance (but not limited to): amorphous silicon, polycrystalline silicon, microcrystalline silicon, monocrystalline silicon, organic a semiconductor material, an oxide semiconductor material (such as indium zinc oxide, indium gallium zinc oxide, other suitable materials, or a combination of the above), a material containing a dopant in the above materials, other suitable materials, or a combination of the above, and the material of another sublayer (such as the sublayer N10$b$) is, for instance (but not limited to): a metal material, alloy, nitride of a metal material, oxide of a metal material, oxynitride of a metal material, a non-metallic material with electrical conductive properties, or other suitable materials. From another perspective, any person having ordinary skill in the art should be able to understand that, in the present embodiment, a sublayer (such as the sublayer N10$a$) of any of the second signal lines N1 to N16 and the active layers CH may be formed in the same photomask process, and another sublayer (such as the sublayer N10$b$) of any of the second signal lines N1 to N16 and the sources S and the drains D may be formed in the same photomask process.

Moreover, as shown in FIG. 4, in the present embodiment, the sublayer N10$a$ is not provided below a portion of the sublayer N10$b$, but the invention is not limited thereto. In other embodiments, the sublayer N10$a$ may be provided below the whole sublayer N10$b$, and at this point, the sublayer N10$b$ and the sublayer N10$a$ may be formed in the same photomask process.

Referring to FIG. 2 and FIG. 4, in the present embodiment, the dummy signal line R10 includes a sublayer R10$a$ and a sublayer R10$b$, wherein the sublayer R10$b$ is located on the sublayer R10$a$. Moreover, in the present embodiment, the sublayer R10$b$ is directly located on the sublayer R10$a$. Accordingly, any person having ordinary skill in the art should be able to understand that, in the present embodiment, the dummy signal lines R1 to R15 may all include a bilayer structure.

Moreover, referring to all of FIG. 2, FIG. 3, and FIG. 4, in the present embodiment, the material of the sublayer R10$a$ and the material of the active layer CH are the same, and the material of the sublayer R10$b$ and the material of the source S and the drain D are the same. In other words, any person having ordinary skill in the art should be able to understand that, in the present embodiment, the material of a sublayer (such as the sublayer R10$a$) of any of the dummy signal lines R1 to R15 includes, for instance (but not limited to): amorphous silicon, polycrystalline silicon, microcrystalline silicon, monocrystalline silicon, an organic semiconductor material, an oxide semiconductor material (such as indium zinc oxide, indium gallium zinc oxide, other suitable materials, or a combination of the above), a material containing a dopant in the above materials, other suitable materials, or a combination of the above, and the material of another sublayer (such as the sublayer R10b) is, for instance (but not limited to): a metal material, alloy, nitride of a metal material, oxide of a metal material, oxynitride of a metal material, a non-metallic material with electrical conductive properties, or other suitable materials. From another perspective, any person having ordinary skill in the art should be able to understand that, in the present embodiment, a sublayer (such as the sublayer R10a) of any of the dummy signal lines R1 to R15 and the active layers CH may be formed in the same photomask process, and another sublayer (such as the sublayer R10b) of any of the dummy signal lines R1 to R15 and the sources S and the drains D may be formed in the same photomask process.

Moreover, as shown in FIG. 4, in the present embodiment, the sublayer R10a is not provided below a portion of the sublayer R10b, but the invention is not limited thereto. In other embodiments, the sublayer R10a may be provided below the whole sublayer R10b, and at this point, the sublayer R10b and the sublayer R10a may be formed in the same photomask process.

It should be mentioned that, in the present embodiment, the second signal lines N1 to N16 and the dummy signal lines R1 to R15 may include a bilayer structure (such as the second signal line N10 includes the sublayer N10a and the sublayer N10b, and the dummy signal line R10 includes the sublayer R10a and the sublayer R10b), and the material of a sublayer in any bilayer structure is the same as the material of the active layer CH (such as the material of the sublayer N10a is the same as the material of the active layer CH, and the material of the sublayer R10a is the same as the material of the active layer CH), and therefore the loading (such as RC-loading) of the second signal lines N1 to N16 and the dummy signal lines R1 to R15 may be reduced. Alternatively, in the case that the shape of the substrate 102 is non-rectangular or the shape of the peripheral region B is irregular such that the remaining spaces thereof are different, the impedance between the first signal lines M1 to M16, between the second signal lines N1 to N16, and between the dummy signal lines R1 to R15 in the gate driving circuit GD may be more consistent by controlling the length or modifying the material properties of the sublayer N10a and the sublayer N10b in the second signal lines N1 to N16 or the sublayer R10a and the sublayer R10b in the dummy signal lines R1 to R15 to increase the display quality of the display panel 10.

Referring to all of FIG. 2, FIG. 3, and FIG. 4, in the present embodiment, the insulation layer L1 is located between the first signal line M9 and the second signal line N10, and the insulation layer L1 is located between the first signal line M11 and the dummy signal line R10. In other words, any person having ordinary skill in the art should be able to understand that, in the present embodiment, the insulation layer L1 is located between the first signal lines M1 to M16 and the second signal lines N1 to N16, and the insulation layer L1 is located between the first signal lines M1 to M16 and the dummy signal lines R1 to R15. From another perspective, in the present embodiment, a cross-over capacitance is formed between the first signal lines M1 to M16 and the second signal lines N1 to N16, wherein the insulation layer L1 located between the first signal lines M1 to M16 and the second signal lines N1 to N16 is used as a capacitor insulation layer of the cross-over capacitance. For instance, in the present embodiment, a cross-over capacitance is formed between the first signal line M1 and the second signal lines N2 to N16, and a cross-over capacitance is formed between the second signal line N16 and the first signal lines M1 to M15. Similarly, in the present embodiment, a cross-over capacitance is formed between the first signal lines M1 to M16 and the dummy signal lines R1 to R15, wherein the insulation layer L1 located between the first signal lines M1 to M16 and the dummy signal lines R1 to R15 is used as a capacitor insulation layer of the cross-over capacitance. For instance, in the present embodiment, a cross-over capacitance is formed between the first signal line M16 and the dummy signal lines R1 to R15, and a cross-over capacitance is formed between the dummy signal line R1 and the first signal lines M2 to M16.

It should be mentioned that, as described above, in the present embodiment, the second signal lines N1 to N16 and the dummy signal lines R1 to R15 may include a bilayer structure, and the material of a sublayer in any bilayer structure is the same as the material of the active layer CH, such that the capacitance value of the cross-over capacitance formed between the first signal lines M1 to M16 and the second signal lines N1 to N16 and the capacitance value of the cross-over capacitance formed between the dummy signal lines R1 to R15 and the first signal lines M1 to M16 are different due to the different film layers in which a signal inputted from an external circuit is located. For instance, the cross-over capacitance value between the first signal line M1 and the second signal lines N2 to N16 is greater than the cross-over capacitance value between the dummy signal line R1 and the first signal lines M2 to M16 due to, in terms of the cross-over capacitance between the first signal line M1 and the second signal lines N2 to N16, a signal inputted from an external circuit is on the first signal line M1; and in terms of the cross-over capacitance between the dummy signal line R1 and the first signal lines M2 to M16, the signal inputted from an external circuit is on the dummy signal line R1.

Referring to FIG. 2 and FIG. 4, in the present embodiment, the contact structure C10 includes a structure pattern C10a and a structure pattern C10b, wherein the structure pattern C10b is directly connected to the structure pattern C10a via a contact window V2 located in the insulation layer L2, the structure pattern C10b is directly connected to the first signal line M10 via a contact window V1 located in the insulation layer L1, the structure pattern C10a, and the insulation layer L2, and the structure pattern C10a is directly connected to the sublayer N10b in the second signal line N10 and the sublayer R10b in the dummy signal line R10.

Referring to all of FIG. 2, FIG. 3, and FIG. 4, in the present embodiment, the material of the structure pattern C10a in the contact structure C10 is the same as the material of the sublayer N10b in the second signal line N10 and the material of the sublayer R10b in the dummy signal line R10. In other words, in the present embodiment, the material of part structure of any of the contact structures C1 to C16 is, for instance (but not limited to): a metal material, alloy, nitride of a metal material, oxide of a metal material, oxynitride of a metal material, a non-metallic material with electrical conductive properties, or other suitable materials. From another perspective, any person having ordinary skill in the art should be able to understand that, in the present embodiment, part structure of any of the contact structures C1 to C16 may be formed in the same photomask process as the sources S and the drains D.

Referring to all of FIG. 2, FIG. 3, and FIG. 4, in the present embodiment, the material of the structure pattern C10b in the contact structure C10 is the same as the material of the pixel electrode PE. In other words, in the present embodiment, the material of part the structure of any of the contact structures C1 to C16 is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, part structure of any of the contact structures C1 to C16 may be formed in the same photomask process as the pixel electrodes PE.

Moreover, as shown in FIG. 4, in the present embodiment, the structure pattern C10a in the contact structure C10 is directly on the insulation layer L1, but the invention is not limited thereto. In other embodiments, a film layer for which the material is the same as the material of the active layer CH may be disposed between the structure pattern C10a in the contact structure C10 and the insulation layer L1, and at this point, the film layer and the structure pattern C10a may be formed in the same photomask process, and the contact window V1 is further located in the film layer. Based on the descriptions for the contact structure C10 above, any person having ordinary skill in the art should be able to extrapolate the structures of the remaining contact structures C1 to C9 and C11 to C16.

Referring again to FIG. 2, in the present embodiment, the second signal line N1 is electrically connected to the scan line SL1, the second signal line N2 is electrically connected to the scan line SL2, the second signal line N3 is electrically connected to the scan line SL3, the second signal line N4 is electrically connected to the scan line SL4, the second signal line N5 is electrically connected to the scan line SL5, the second signal line N6 is electrically connected to the scan line SL6, the second signal line N7 is electrically connected to the scan line SL7, the second signal line N8 is electrically connected to the scan line SL8, the second signal line N9 is electrically connected to the scan line SL9, the second signal line N10 is electrically connected to the scan line SL10, the second signal line N11 is electrically connected to the scan line SL11, the second signal line N12 is electrically connected to the scan line SL12, the second signal line N13 is electrically connected to the scan line SL13, the second signal line N14 is electrically connected to the scan line SL14, the second signal line N15 is electrically connected to the scan line SL15, and the second signal line N16 is electrically connected to the scan line SL16. In other words, in the present embodiment, the second signal lines N1 to N16 are respectively electrically connected to the corresponding scan lines SL1 to SL16. From another perspective, in the present embodiment, the second signal lines N1 to N16 and the scan lines SL1 to SL16 may have a one-to-one connection relationship, such that a signal received by the second signal lines N1 to N16 respectively from the corresponding first signal lines M1 to M16 may be respectively transfer to the corresponding pixel unit U via the corresponding scan lines SL1 to SL16 to drive the pixel unit U.

In a display panel in which the dummy signal lines R1 to R15 are not disposed in the gate driving circuit GD, a difference of at least 16.3% is generated for the capacitance value of the cross-over capacitance formed between the first signal lines M1 to M16 and the second signal lines N1 to N16, such that the issue of impedance mismatch is generated between the first signal lines M1 to M16 or between the second signal lines N1 to N16, and therefore a distortion phenomenon is generated to a signal inputted from an external circuit, and display quality is affected (such as bright/dark lines are generated in the display screen).

Accordingly, in the present embodiment, in the region Z of the display panel 10, the gate driving circuit GD includes the first signal lines M1 to M15 extended along the second direction Y, the second signal lines N1 to N15 extended along the first direction X, the dummy signal lines R1 to R15 extended along the first direction X, and the contact structures C1 to C15, wherein each of the first signal lines M1 to M15 is electrically connected to the corresponding one among the second signal lines N1 to N15 via the corresponding one among the contact structures C1 to C15, and each of the dummy signal lines R1 to R15 is electrically connected to the corresponding one among the second signal lines N1 to N15 via the corresponding one among the contact structure C1 to C15, and therefore in comparison to a display panel in which the dummy signal lines R1 to R15 are not disposed in the gate driving circuit GD, the distribution of the cross-over capacitance value in the gate driving circuit GD of the display panel 10 is more uniform. As a result, under the limitation of a narrow frame, the display panel 10 may effectively prevent the issue of impedance mismatch generated between the first signal lines M1 to M16, between the second signal lines N1 to N16, and between the dummy signal lines R1 to R15 in the gate driving circuit GD to increase the display quality of the display panel 10.

Moreover, as described above, in the embodiments of FIG. 1 to FIG. 4, the second signal lines N1 to N15 and the dummy signal lines R1 to R15 have a one-to-one connection relationship, but the invention is not limited thereto. In other embodiments, the second signal lines N1 to N15 and the dummy signal lines R1 to R15 may also have a one-to-many connection relationship.

Moreover, as described above, in the embodiments of FIG. 1 to FIG. 4, the material of any of the second signal lines N1 to N16 includes the same material as the active layers CH and the same material as the sources S and the drains D, the material of any of the dummy signal lines R1 to R15 includes the same material as the active layers CH and the same material as the sources S and the drains D, and the material of any of the contact structures C10 to C16 includes the same material as the sources S and the drains D and the same material as the pixel electrodes PE, but the invention is not limited thereto. In the following, other configurations are described in detail with reference to FIG. 5. It should be mentioned here that, the embodiments below adopt the reference numerals of the embodiments above and a portion of the content thereof, wherein the same or similar reference numerals are used to represent the same or similar devices and descriptions of the same technical content are omitted. The omitted portions are described in the previous embodiments and are not repeated in the following embodiments.

Figure 5:
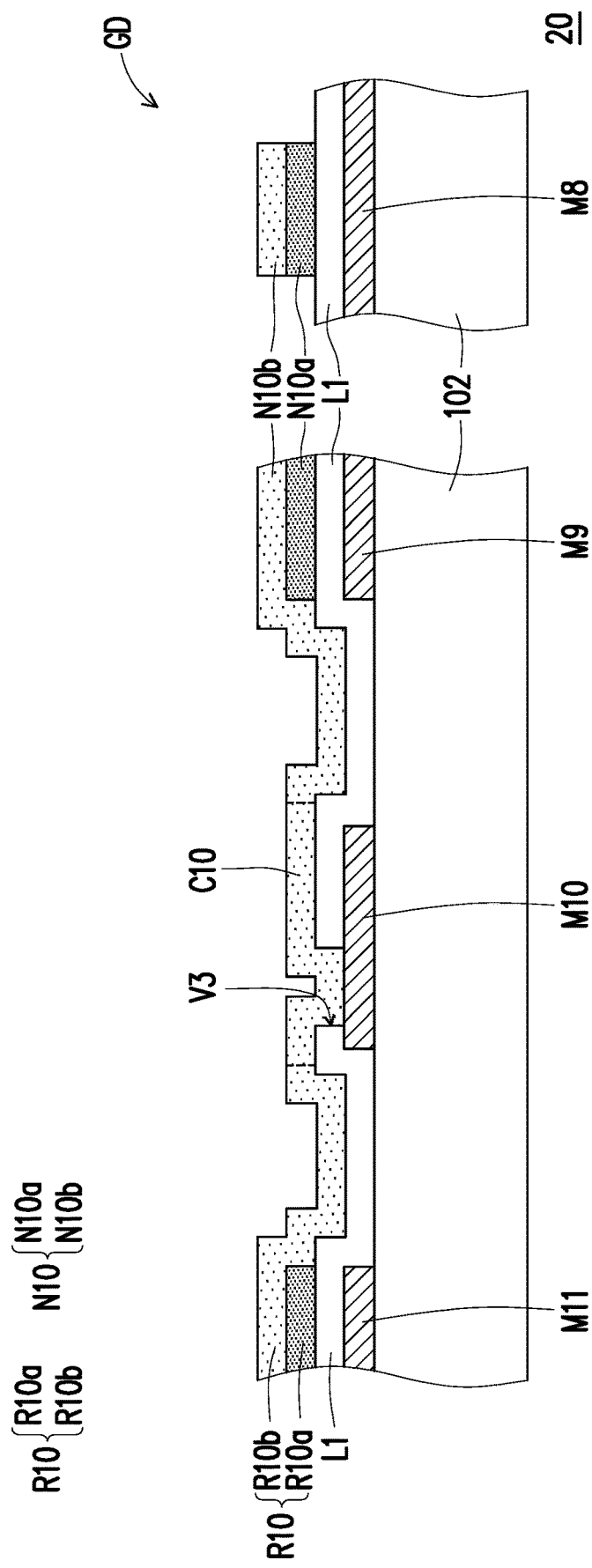
FIG. 5 is a partial cross section of a gate driving circuit in a display panel of another embodiment of the invention.

FIG. 5 is a partial cross section of a gate driving circuit in a display panel of another embodiment of the invention. It should be mentioned that, the cross-section location of FIG. 5 may correspond to the locations of section line I-I' and section line II-II' in FIG. 2, FIG. 5 only shows a partial structure of the gate driving circuit GD in the display panel 20, and the top view of the gate driving circuit GD in the display panel 20 of FIG. 5 is as provided in FIG. 2. However, according to the content of the embodiments of FIG. 1 to FIG. 4, any person having ordinary skill in the art should be able to understand the overall structure or layout of the display panel 20.

Referring to both FIG. 5 and FIG. 4, the gate driving circuit GD in the display panel 20 of FIG. 5 is similar to the gate driving circuit GD in the display panel 10 of FIG. 4, and therefore the same or similar devices are represented by the same or similar reference numerals, and descriptions of the same technical content are omitted. Descriptions of the omitted portions are as provided in the embodiments of FIG. 1 to FIG. 4. In the following, the differences between the gate driving circuit GD in the display panel 20 of FIG. 5 and the gate driving circuit GD in the display panel 10 of FIG. 4 are described.

Referring to FIG. 5, in the present embodiment, the material of the sublayer N10a in the second signal line N10 is the same as the material of the active layer CH, and the material of the sublayer N10b in the second signal line N10 is the same as the material of the pixel electrode PE. In other words, any person having ordinary skill in the art should be able to understand that, in the present embodiment, the material of a sublayer (such as the sublayer N10a) of any of the second signal lines N1 to N16 includes, for instance (but not limited to): amorphous silicon, polycrystalline silicon, microcrystalline silicon, monocrystalline silicon, an organic semiconductor material, an oxide semiconductor material (such as indium zinc oxide, indium gallium zinc oxide, other suitable materials, or a combination of the above), a material containing a dopant in the above materials, other suitable materials, or a combination of the above, and the material of another sublayer (such as the sublayer N10b) is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, a sublayer (such as the sublayer N10a) of any of the second signal lines N1 to N16 and the active layers CH may be formed in the same photomask process, and another sublayer (such as the sublayer N10b) of any of the second signal lines N1 to N16 and the pixel electrodes PE may be formed in the same photomask process.

Referring to FIG. 5, in the present embodiment, the material of the sublayer R10a in the dummy signal line R10 is the same as the material of the active layer CH, and the material of the sublayer R10b in the dummy signal line R10 is the same as the material of the pixel electrode PE. In other words, any person having ordinary skill in the art should be able to understand that, in the present embodiment, the material of a sublayer (such as the sublayer R10a) of any of the dummy signal lines R1 to R15 includes, for instance (but not limited to): amorphous silicon, polycrystalline silicon, microcrystalline silicon, monocrystalline silicon, an organic semiconductor material, an oxide semiconductor material (such as indium zinc oxide, indium gallium zinc oxide, other suitable materials, or a combination of the above), a material containing a dopant in the above materials, other suitable materials, or a combination of the above, and the material of another sublayer (such as the sublayer R10b) is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, a sublayer (such as the sublayer R10a) of any of the dummy signal lines R1 to R15 and the active layers CH may be formed in the same photomask process, and another sublayer (such as the sublayer R10b) of any of the dummy signal lines R1 to R15 and the pixel electrodes PE may be formed in the same photomask process.

Referring to FIG. 5, in the present embodiment, the contact structure C10 is directly connected to the first signal line M10 via the contact window V3 located in the insulation layer L1, and the contact structure C10 is directly connected to the sublayer N10b in the second signal line N10 and the sublayer R10b in the dummy signal line R10. In other words, in the present embodiment, the contact structure C10 is a single-layer structure. Moreover, referring to FIG. 5, in the present embodiment, the material of the contact structure C10 is the same as the material of the sublayer N10b in the second signal line N10 and the material of the sublayer R10b in the dummy signal line R10. For instance, in the case that the material of the contact structure C10 is the same as the material of the sublayer N10b and the material of the sublayer R10b, the contact structure C10 and the contact window V3 are overlapped in the vertical projection direction N, the sublayer N10b in the second signal line N10 is extended from the contact window V3 toward the display region A, and the sublayer R10b in the dummy signal line R10 is extended from the contact window V3 toward the peripheral region B. In the present embodiment, the material of any of the contact structures C1 to C16 is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, any of the contact structures C1 to C16 may be formed in the same photomask process as the pixel electrodes PE. Based on the descriptions for the contact structure C10 in the display panel 20 above, any person having ordinary skill in the art should be able to extrapolate the structures of the remaining contact structures C1 to C9 and C11 to C16 in the display panel 20.

It should be mentioned that, it may be known based on the embodiments of FIG. 1 to FIG. 4 that, in the region Z of the display panel 20, the gate driving circuit GD includes the first signal lines M1 to M15 extended along the second direction Y, the second signal lines N1 to N15 extended along the first direction X, the dummy signal lines R1 to R15 extended along the first direction X, and the contact structures C1 to C15, wherein each of the first signal lines M1 to M15 is electrically connected to the corresponding one among the second signal lines N1 to N15 via the corresponding one among the contact structures C1 to C15, and each of the dummy signal lines R1 to R15 is electrically connected to the corresponding one among the second signal lines N1 to N15 via the corresponding one among the contact structures C1 to C15, and therefore the distribution of the cross-over capacitance value in the gate driving circuit GD of the display panel 20 is uniform. As a result, under the limitation of a narrow frame, the display panel 20 may effectively prevent the issue of impedance mismatch generated between the first signal lines M1 to M16, between the second signal lines N1 to N16, and between the dummy signal lines R1 to R15 in the gate driving circuit GD to increase the display quality of the display panel 20.

Moreover, as described above, in the embodiments of FIG. 1 to FIG. 4, the material of any of the second signal lines N1 to N16 includes the same material as the active layers CH and the same material as the sources S and the drains D, and the material of any of the dummy signal lines R1 to R15 also includes the same material as the active layers CH and the same material as the sources S and the drains D, that is, the second signal lines N1 to N16 and the dummy signal lines R1 to R15 have the same constitution, but the invention is not limited thereto. In the following, other configurations are described in detail with reference to FIG. 6. It should be mentioned here that, the embodiments below adopt the reference numerals of the embodiments above and a portion of the content thereof, wherein the same or similar reference numerals are used to represent the same or similar devices and descriptions of the same technical content are omitted. The omitted portions are described in the previous embodiments and are not repeated in the following embodiments.

Figure 6:
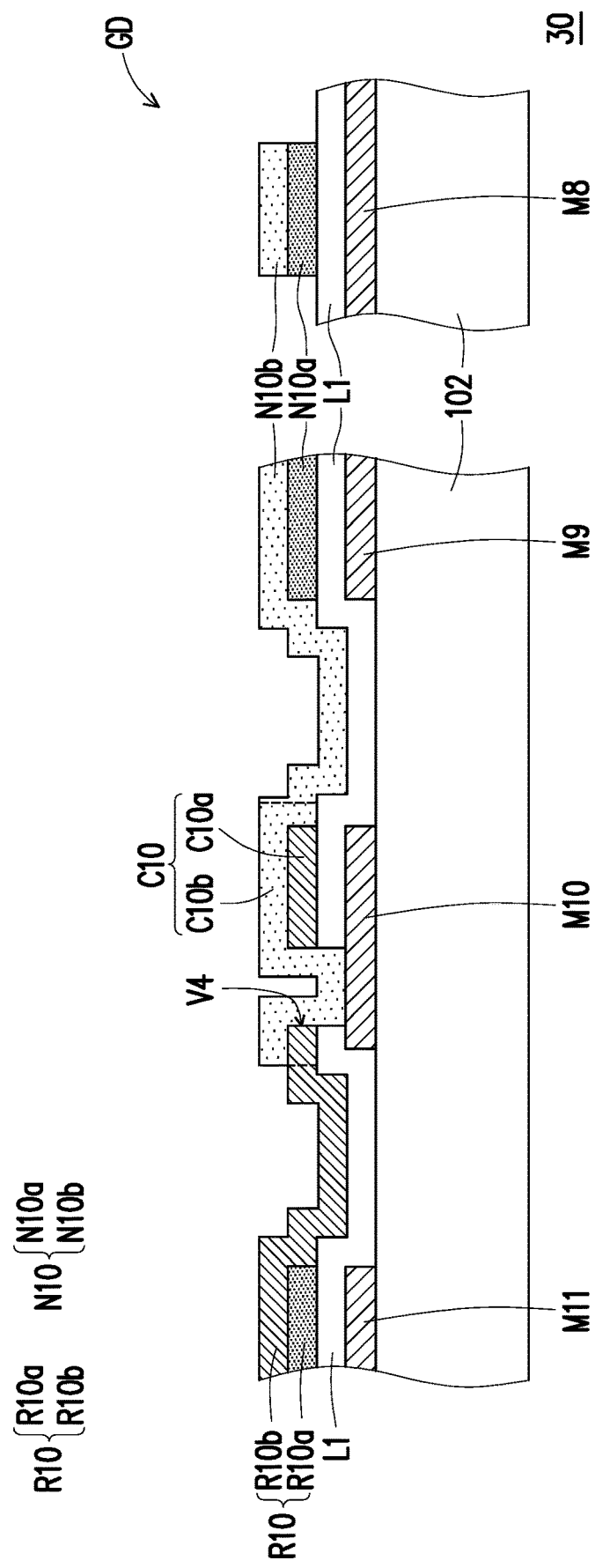
FIG. 6 is a partial cross section of a gate driving circuit in a display panel of another embodiment of the invention.

FIG. 6 is a partial cross section of a gate driving circuit in a display panel of another embodiment of the invention. It should be mentioned that, the cross-section location of FIG. 6 may correspond to the locations of section line I-I' and section line II-I' in FIG. 2, FIG. 6 only shows a partial structure of the gate driving circuit GD in the display panel 30, and the top view of the gate driving circuit GD in the display panel 30 of FIG. 6 is as provided in FIG. 2. However, according to the content of the embodiments of FIG. 1 to FIG. 4, any person having ordinary skill in the art should be able to understand the overall structure or layout of the display panel 30.

Referring to both FIG. 6 and FIG. 4, the gate driving circuit GD in the display panel 30 of FIG. 6 is similar to the gate driving circuit GD in the display panel 10 of FIG. 4, and therefore the same or similar devices are represented by the same or similar reference numerals, and descriptions of the same technical content are omitted. Descriptions of the omitted portions are as provided in the embodiments of FIG. 1 to FIG. 4. In the following, the differences between the gate driving circuit GD in the display panel 30 of FIG. 6 and the gate driving circuit GD in the display panel 10 of FIG. 4 are described.

Referring to FIG. 6, in the present embodiment, the material of the sublayer N10a in the second signal line N10 is the same as the material of the active layer CH, and the material of the sublayer N10b in the second signal line N10 is the same as the material of the pixel electrode PE. In other words, any person having ordinary skill in the art should be able to understand that, in the present embodiment, the material of a sublayer (such as the sublayer N10a) of any of the second signal lines N1 to N16 includes, for instance (but not limited to): amorphous silicon, polycrystalline silicon, microcrystalline silicon, monocrystalline silicon, an organic semiconductor material, an oxide semiconductor material (such as indium zinc oxide, indium gallium zinc oxide, other suitable materials, or a combination of the above), a material containing a dopant in the above materials, other suitable materials, or a combination of the above, and the material of another sublayer (such as the sublayer N10b) is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, a sublayer (such as the sublayer N10a) of any of the second signal lines N1 to N16 and the active layers CH may be formed in the same photomask process, and another sublayer (such as the sublayer N10b) of any of the second signal lines N1 to N16 and the pixel electrodes PE may be formed in the same photomask process.

Referring to FIG. 6, in the present embodiment, the structure pattern C10b in the contact structure C10 is directly connected to the first signal line M10 via a contact window V4 located in the insulation layer L1 and the structure pattern C10a, the structure pattern C10b in the contact structure C10 is directly connected to the sublayer N10b in the second signal line N10, and the structure pattern C10a is directly connected to the sublayer R10b in the dummy signal line R10. Moreover, in the present embodiment, since a sublayer (such as the sublayer N10b) of any of the second signal lines N1 to N16 may be formed in the same photomask process as the pixel electrodes PE, part structure (such as the structure pattern C10b) of any of the contact structures C1 to C16 may be formed in the same photomask process as a sublayer (such as the sublayer N10b) of any of the second signal lines N1 to N16. Based on the descriptions for the contact structure C10 in the display panel 30 above, any person having ordinary skill in the art should be able to extrapolate the structures of the remaining contact structures C1 to C9 and C11 to C16 in the display panel 30.

It should be mentioned that, it may be known based on the embodiments of FIG. 1 to FIG. 4 that, in the region Z of the display panel 30, the gate driving circuit GD includes the first signal lines M1 to M15 extended along the second direction Y, the second signal lines N1 to N15 extended along the first direction X, the dummy signal lines R1 to R15 extended along the first direction X, and the contact structures C1 to C15, wherein each of the first signal lines M1 to M15 is electrically connected to the corresponding one among the second signal lines N1 to N15 via the corresponding one among the contact structures C1 to C15, and each of the dummy signal lines R1 to R15 is electrically connected to the corresponding one among the second signal lines N1 to N15 via the corresponding one among the contact structures C1 to C15, and therefore the distribution of the cross-over capacitance value in the gate driving circuit GD of the display panel 30 is uniform. As a result, under the limitation of a narrow frame, the display panel 30 may effectively prevent the issue of impedance mismatch generated between the first signal lines M1 to M16, between the second signal lines N1 to N16, and between the dummy signal lines R1 to R15 in the gate driving circuit GD to increase the display quality of the display panel 30.

Moreover, in the embodiment of FIG. 6, the material of any of the second signal lines N1 to N16 includes the same material as the active layers CH and the same material as the pixel electrodes PE, and the material of any of the dummy signal lines R1 to R15 includes the same material as the active layers CH and the same material as the sources S and the drains D, but the invention is not limited thereto. In another embodiment, the material of any of the second signal lines N1 to N16 may include the same material as the active layers CH and the same material as the sources S and the drains D, and the material of any of the dummy signal lines R1 to R15 may include the same material as the active layers CH and the same material as the pixel electrodes PE. In yet another embodiment, the material of a portion of the second signal lines N1 to N16 may include the same material as the active layers CH and the same material as the sources S and the drains D, the material of another portion of the second signal lines N1 to N16 may include the same material as the active layers CH and the same material as the pixel electrodes PE, the material of a portion of the dummy signal lines R1 to R15 may include the same material as the active layers CH and the same material as the sources S and the drains D, and the material of another portion of the dummy signal lines R1 to R15 may include the same material as the active layers CH and the same material as the pixel electrodes PE. In other words, any case in which one of the second signal lines N1 to N16 and the dummy signal lines R1 to R15 includes the same material as the pixel electrodes PE and the other one of the second signal lines N1 to N16 and the dummy signal lines R1 to R15 includes the same material as the sources S and the drains D is within the scope of the invention.

Moreover, as described above, in the embodiments of FIG. 1 to FIG. 4, the second signal lines N1 to N16 and the dummy signal lines R1 to R15 include a bilayer structure, but the invention is not limited thereto. In the following, other configurations are described in detail with reference to FIG. 7. It should be mentioned here that, the embodiments below adopt the reference numerals of the embodiments above and a portion of the content thereof, wherein the same or similar reference numerals are used to represent the same or similar devices and descriptions of the same technical content are omitted. The omitted portions are described in the previous embodiments and are not repeated in the following embodiments.

Figure 7:
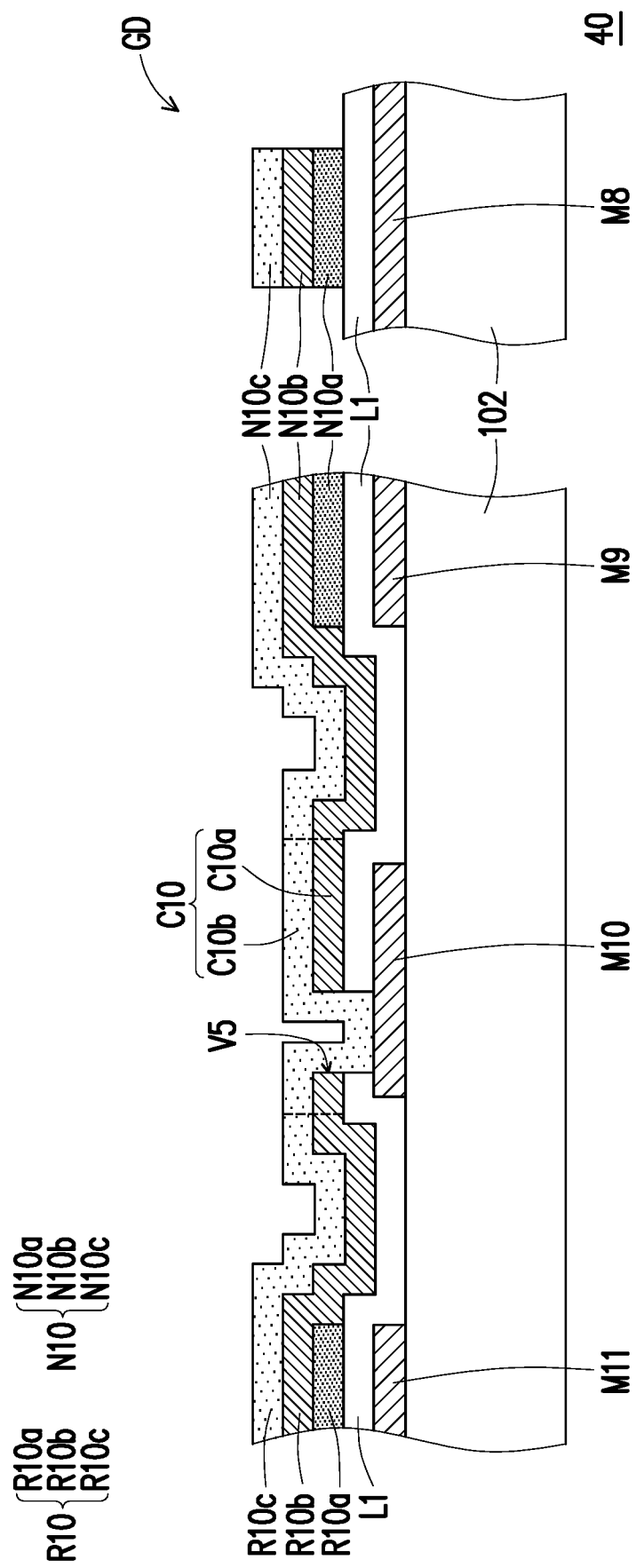
FIG. 7 is a partial cross section of a gate driving circuit in a display panel of another embodiment of the invention.

FIG. 7 is a partial cross section of a gate driving circuit in a display panel of another embodiment of the invention. It should be mentioned that, the cross-section location of FIG. 7 may correspond to the locations of section line I-I' and section line II-II' in FIG. 2, FIG. 7 only shows a partial structure of the gate driving circuit GD in the display panel 40, and the top view of the gate driving circuit GD in the display panel 40 of FIG. 7 is as provided in FIG. 2. However, according to the content of the embodiments of FIG. 1 to FIG. 4, any person having ordinary skill in the art should be able to understand the overall structure or layout of the display panel 40.

Referring to both FIG. 7 and FIG. 4, the gate driving circuit GD in the display panel 40 of FIG. 7 is similar to the gate driving circuit GD in the display panel 10 of FIG. 4, and therefore the same or similar devices are represented by the same or similar reference numerals, and descriptions of the same technical content are omitted. Descriptions of the omitted portions are as provided in the embodiments of FIG. 1 to FIG. 4. In the following, the differences between the gate driving circuit GD in the display panel 40 of FIG. 7 and the gate driving circuit GD in the display panel 10 of FIG. 4 are described.

Referring to FIG. 7, in the present embodiment, the second signal line N10 includes a sublayer N10c located on the sublayer N10b, wherein the sublayer N10b is located between the sublayer N10a and the sublayer N10c. Moreover, in the present embodiment, the sublayer N10c is directly located on the sublayer N10b. Accordingly, any person having ordinary skill in the art should be able to understand that, in the present embodiment, the second signal lines N1 to N16 all may include a three-layer structure.

Moreover, referring to FIG. 7, in the present embodiment, the material of the sublayer N10c is the same as the material of the pixel electrode PE. In other words, any person having ordinary skill in the art should be able to understand that, in the present embodiment, the material of a sublayer (such as the sublayer N10c) of any of the second signal lines N1 to N16 is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, a sublayer (such as the sublayer N10c) of any of the second signal lines N1 to N16 may be formed in the same photomask process as the pixel electrodes PE.

Referring to FIG. 7, in the present embodiment, the dummy signal line R10 includes a sublayer R10c located on the sublayer R10b, wherein the sublayer R10b is located between the sublayer R10a and the sublayer R10c. Moreover, in the present embodiment, the sublayer R10c is directly located on the sublayer R10b. Accordingly, any person having ordinary skill in the art should be able to understand that, in the present embodiment, the dummy signal lines R1 to R15 may all include a three-layer structure.

Moreover, referring to FIG. 7, in the present embodiment, the material of the sublayer R10c is the same as the material of the pixel electrode PE. In other words, any person having ordinary skill in the art should be able to understand that, in the present embodiment, the material of a sublayer (such as the sublayer R10c) of any of the dummy signal lines R1 to R15 is, for instance (but not limited to): indium tin oxide, indium zinc oxide, aluminum tin oxide, aluminum zinc oxide, indium gallium zinc oxide, other suitable oxides, or stacked layers of at least two of the above. From another perspective, any person having ordinary skill in the art should be able to understand that, in the present embodiment, a sublayer (such as the sublayer R10c) of any of the dummy signal lines R1 to R15 may be formed in the same photomask process as the pixel electrodes PE.

Referring to FIG. 7, in the present embodiment, the structure pattern C10b in the contact structure C10 is directly connected to the first signal line M10 via a contact window V5 located in the insulation layer L1 and the structure pattern C10a, and the structure pattern C10b in the contact structure C10 is directly connected to the sublayer N10c in the second signal line N10 and the sublayer R10c in the dummy signal line R10. Moreover, in the present embodiment, since a sublayer (such as the sublayer N10c) of any of the second signal lines N1 to N16 and a sublayer (such as the sublayer R10c) of any of the dummy signal lines R1 to R15 may be formed in the same photomask process as the pixel electrodes PE, part structure (such as the structure pattern C10b) of any of the contact structures C1 to C16 may be formed in the same photomask process as a sublayer (such as the sublayer N10c) of any of the second signal lines N1 to N16 and a sublayer (such as the sublayer R10c) of any of the dummy signal lines R1 to R15. Based on the descriptions for the contact structure C10 in the display panel 40 above, any person having ordinary skill in the art should be able to extrapolate the structures of the remaining contact structures C1 to C9 and C11 to C16 in the display panel 40.

It should be mentioned that, it may be known based on the embodiments of FIG. 1 to FIG. 4 that, in the region Z of the display panel 40, the gate driving circuit GD includes the first signal lines M1 to M15 extended along the second direction Y, the second signal lines N1 to N15 extended along the first direction X, the dummy signal lines R1 to R15 extended along the first direction X, and the contact structures C1 to C15, wherein each of the first signal lines M1 to M15 is electrically connected to the corresponding one among the second signal lines N1 to N15 via the corresponding one among the contact structures C1 to C15, and each of the dummy signal lines R1 to R15 is electrically connected to the corresponding one among the second signal lines N1 to N15 via the corresponding one among the contact structures C1 to C15, and therefore the distribution of the cross-over capacitance value in the gate driving circuit GD of the display panel 40 is uniform. As a result, under the limitation of a narrow frame, the display panel 40 may effectively prevent the issue of impedance mismatch generated between the first signal lines M1 to M16, between the second signal lines N1 to N16, and between the dummy signal lines R1 to R15 in the gate driving circuit GD to increase the display quality of the display panel 40.

Moreover, in the present embodiment, the second signal lines N1 to N16 and the dummy signal lines R1 to R15 may include a three-layer structure (such as the second signal line N10 includes the sublayer N10a, the sublayer N10b, and the sublayer N10c, and the dummy signal line R10 includes the sublayer R10a, the sublayer R10b, and the sublayer R10c), and the material of any three-layer structure includes the same material as the active layers CH, the same material as the sources S and the drains D, and the same material as the pixel electrodes PE (such as the material of the sublayer N10a is the same as the material as the active layers CH, the material of the sublayer N10b is the same as the material of the sources S and the drains D, and the material of the sublayer N10c is the same as the material of the pixel electrodes PE), and therefore the loading (such as RC-loading) of the second signal lines N1 to N16 and the dummy signal lines R1 to R15 may be reduced.

Moreover, as described above, in the embodiments of FIG. 1 to FIG. 4, the first signal lines M1 to M15 are extended along the second direction Y, the dummy signal lines R1 to R15 are extended along the first direction X, and the first direction X and the second direction Y are substantially perpendicular, that is, the first signal lines M1 to M15 and the dummy signal lines R1 to R15 are substantially perpendicular to each other, but the invention is not limited thereto. In the following, other configurations are described in detail with reference to FIG. 8.

Figure 8:
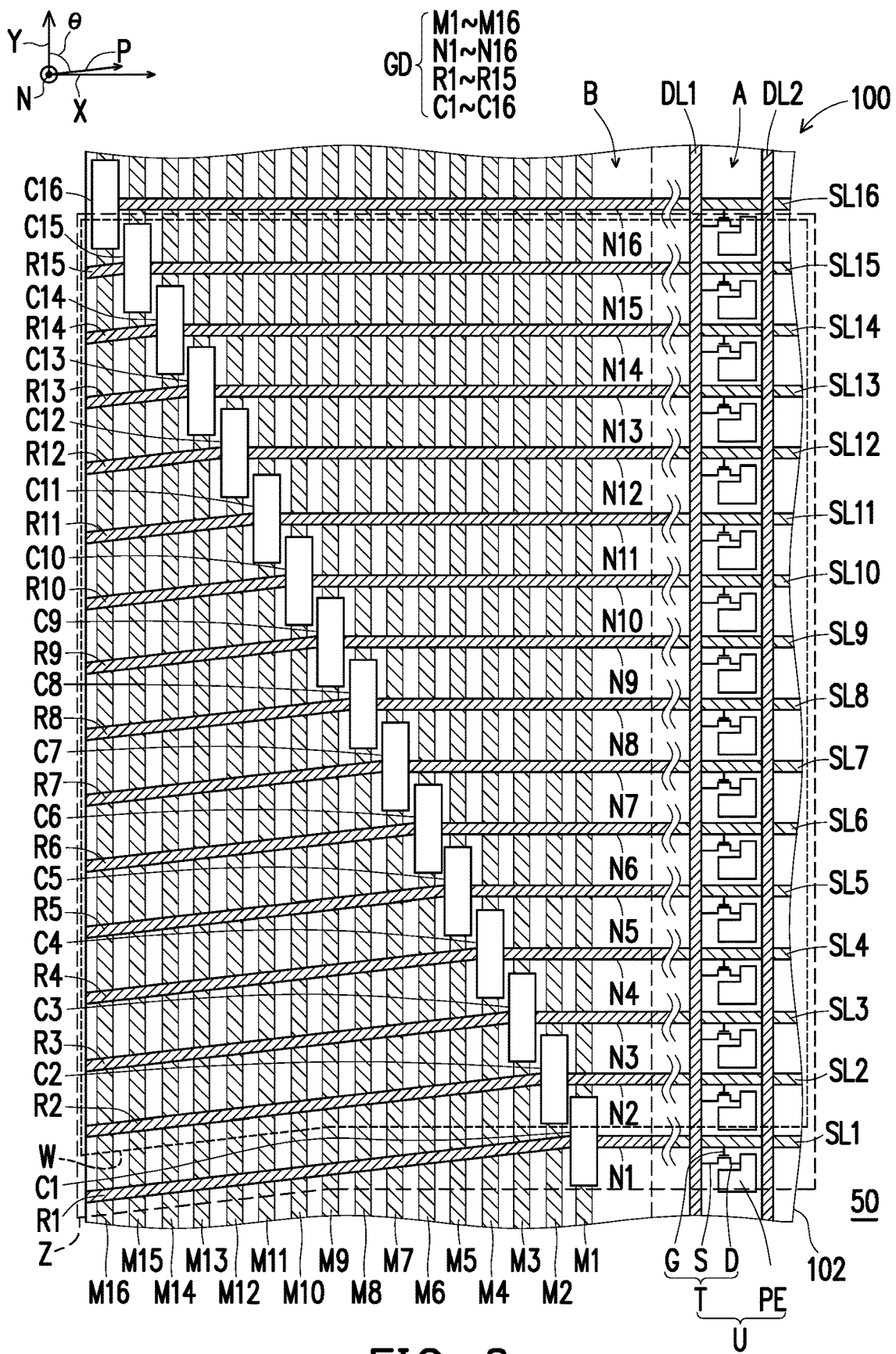
FIG. 8 is a top view of a pixel array substrate of another embodiment of the invention.

FIG. 8 is a top view of a pixel array substrate of another embodiment of the invention. Referring to both FIG. 8 and FIG. 2, the pixel array substrate 100 in the display panel 50 of FIG. 8 is similar to the pixel array substrate 100 in the display panel 10 of FIG. 2, and therefore the same or similar devices are represented by the same or similar reference numerals, and descriptions of the same technical content are omitted. Descriptions of the omitted portions are as provided in the embodiments of FIG. 1 to FIG. 4, and according to the content of the embodiments of FIG. 1 to FIG. 4, any person having ordinary skill in the art should be able to understand the overall structure or layout of the display panel 50. In the following, the differences between the pixel array substrate 100 in the display panel 50 of FIG. 8 and the pixel array substrate 100 in the display panel 10 of FIG. 2 are described.

Referring to FIG. 8, in the present embodiment, the dummy signal lines R1 to R15 are extended along a third direction P. Specifically, in the present embodiment, the third direction P and the first direction X are different, and the third direction P and the second direction Y are different. In other words, in the present embodiment, the dummy signal lines R1 to R15 and the first signal lines M1 to M16 are disposed across each other, and the dummy signal lines R1 to R15 and the second signal lines N1 to N16 are disposed across each other. Specifically, in the present embodiment, an angle θ is between the third direction P and the second direction Y, wherein the angle θ is between the range of about 45 degrees to about 135 degrees, and as the size of the display panel 50 gets smaller, the space of the peripheral region B is insufficient, the value of the angle θ is reduced as a result, and the length of the dummy signal lines R1 to R15 is increased in comparison to the embodiment in FIG. 2 in which the angle θ is 90 degrees, thereby the adjustable range of resistance compensation is increased.

It should be mentioned that, it may be known based on the embodiments of FIG. 1 to FIG. 4 that, in the region Z of the display panel 50, the gate driving circuit GD includes the first signal lines M1 to M15 extended along the second direction Y, the second signal lines N1 to N15 extended along the first direction X, the dummy signal lines R1 to R15 extended along the first direction X, and the contact structures C1 to C15, wherein each of the first signal lines M1 to M15 is electrically connected to the corresponding one among the second signal lines N1 to N15 via the corresponding one among the contact structures C1 to C15, and each of the dummy signal lines R1 to R15 is electrically connected to the corresponding one among the second signal lines N1 to N15 via the corresponding one among the contact structures C1 to C15, and therefore the distribution of the cross-over capacitance value in the gate driving circuit GD of the display panel 50 is uniform. As a result, under the limitation of a narrow frame, the display panel 50 may effectively prevent the issue of impedance mismatch between the first signal lines M1 to M15, between the second signal lines N1 to N15, and between the dummy signal lines R1 to R15 in the gate driving circuit GD to increase the display quality of the display panel 50.

Based on the above, in the display panel of the embodiments above, the gate driving circuit disposed in the peripheral region in the pixel array substrate of the display panel includes the plurality of first signal lines arranged along the first direction and extended along the second direction, the plurality of second signal lines extended along the first direction, the plurality of dummy signal lines extended along the first direction, and the plurality of contact structures disposed corresponding to the plurality of first signal lines, the plurality of second signal lines and the plurality of dummy signal lines, wherein each of the plurality of first signal lines is electrically connected to one corresponding second signal line via one corresponding contact structure, each of the plurality of dummy signal lines is electrically connected to one corresponding second signal line via one corresponding contact structure, and each of the plurality of second signal lines is respectively electrically connected to one corresponding scan line, such that the distribution of the cross-over capacitance value in the gate driving circuit is uniform. As a result, under the limitation of a narrow frame, the display panel may effectively prevent the issue of impedance mismatch between the plurality of first signal lines, between the plurality of second signal lines, and between the plurality of dummy signal lines in the gate driving circuit to increase the display quality of the display panel.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display panel, comprising:
   a pixel array substrate, comprising:
      a substrate having a display region and a peripheral region, wherein the peripheral region is located at a side of the display region;
      a plurality of scan lines and a plurality of data lines disposed in the display region;
      a plurality of pixel units arranged in the display region in array, wherein each of the pixel units is electrically connected to one of the scan lines and one of the data lines, and each of the pixel units comprises:
         an active device comprising a gate, an active layer, a source, and a drain; and a pixel electrode electrically connected to the drain of the active device; and a gate driving circuit disposed in the peripheral region, wherein the gate driving circuit comprises:

a plurality of first signal lines arranged in the peripheral region along a first direction and extended along a second direction;

a plurality of second signal lines extended along the first direction, and each of the second signal lines is respectively electrically connected to one corresponding first signal line, wherein each of the second signal lines comprises a first sublayer and a second sublayer, the second sublayer is located on the first sublayer, a material of the first sublayer is the same as a material of the active layer, and a material of the second sublayer is the same as a material of the source and the drain;

a plurality of dummy signal lines extended along the first direction, and each of the dummy signal lines is respectively electrically connected to one corresponding second signal line, wherein each of the dummy signal lines comprises the first sublayer and the second sublayer;

a plurality of contact structures respectively disposed corresponding to the first signal lines, the second signal lines, and the dummy signal lines, wherein each of the first signal lines is electrically connected to the corresponding second signal line via one corresponding contact structure, and each of the dummy signal lines is electrically connected to the corresponding second signal line via the corresponding contact structure; and an insulation layer disposed on the substrate, wherein the insulation layer is located between the gates and the active layers;

an opposite substrate disposed opposite to the pixel array substrate; and a display media disposed between the opposite substrate and the pixel array substrate.

2. The display panel of claim 1, wherein lengths of the second signal lines are different from one another.

3. The display panel of claim 1, wherein lengths of the dummy signal lines are different from one another.

4. The display panel of claim 1, wherein ends of the dummy signal lines are aligned with an edge of the substrate.

5. The display panel of claim 1, wherein each of the second signal lines is respectively overlapped with at least one of the first signal lines in a vertical projection direction, and each of the dummy signal lines is respectively overlapped with at least one of the first signal lines in the vertical projection direction.

6. The display panel of claim 1, wherein a material of the first signal lines is the same as a material of the gate.

7. The display panel of claim 1, wherein the insulation layer is located between the first signal lines and the second signal lines, and the insulation layer is located between the first signal lines and the dummy signal lines.

8. The display panel of claim 1, wherein a material of the contact structures comprises a same material as the pixel electrode.

9. The display panel of claim 1, wherein the contact structures are not located on a same horizontal axis.

10. The display panel of claim 1, wherein a sum of a length of the second signal line and a length of the dummy signal line corresponding to one of the contact structures is the same as a sum of a length of the second signal line and a length of the dummy signal line corresponding to another one of the contact structures.

* * * * *